United States Patent [19]

Koa

[11] Patent Number: 5,044,694
[45] Date of Patent: Sep. 3, 1991

[54] SEAT PAN AND SPRING PLATE ASSEMBLY

[75] Inventor: Chi H. Koa, Jackson, Mich.

[73] Assignee: Michigan Seat Company, Jackson, Mich.

[21] Appl. No.: 639,018

[22] Filed: Jan. 9, 1991

[51] Int. Cl.$^5$ .............................................. A47C 7/00
[52] U.S. Cl. .................................. 297/452; 297/459; 297/445
[58] Field of Search ............... 297/452, 440, 458, 445, 297/459, DIG. 2, 457; 248/903

[56] References Cited

U.S. PATENT DOCUMENTS

| | | | |
|---|---|---|---|
| 717,211 | 12/1902 | Judd | 297/459 |
| 2,570,396 | 10/1951 | Simmons | 155/179 |
| 3,669,499 | 6/1972 | Semplonius et al. | 297/445 X |
| 3,825,302 | 7/1974 | Kurtz | 297/445 X |
| 4,123,105 | 10/1978 | Frey et al. | 297/DIG. 1 X |
| 4,577,907 | 3/1986 | Talmon et al. | 297/445 |
| 4,896,919 | 1/1990 | Muraishi et al. | 297/452 |

Primary Examiner—Kenneth J. Dorner
Assistant Examiner—Milton Nelson, Jr.
Attorney, Agent, or Firm—Beaman & Beaman

[57] ABSTRACT

A seat spring plate mount and seat pan assembly for mounting and reinforcing a cushioned seat having an integral seat pan. A reinforcing spring plate with formed locating, reinforcing arcuate ridges which complement seat pan embossments with which they mate is mounted on the inside surface of the seat pan bottom. The spring plate is fastened to the seat pan by formed cylindrical projections extending outward from the spring plate, through holes formed in seat pan rectangular embossments upon which the spring mounting plate rests, which are staked underneath the seat in the manner of a rivet. The seat plate includes at least one internally threaded fastening device bonded to it to receive the externally threaded bolt used to fasten the seat to the vehicle or seat leaf spring.

9 Claims, 1 Drawing Sheet

SEAT PAN AND SPRING PLATE ASSEMBLY

BACKGROUND OF THE INVENTION

Seats having synthetic foam cushions are widely employed in a variety of applications. As foam cushions in themselves have little structural strength, it is common to use a support frame or pan to receive and support the nonrigid components. Seats such as those used with tractors, garden tractors, lawn mowers and industrial equipment commonly consist of flexible components supported by a mounting pan assembly with a spring plate attached to the mounting pan the spring plate being interposed between the mounting pan and a mounting spring. The seat pan assemblies are most efficiently finished, such as by painting, after the spring plates are attached.

Part of the process of finishing the assembly is to clean the assembly to remove oil and dirt. Because recesses and irregularities exist on the assembly surfaces and between the assembled components, complete removal of the cleaning solution is difficult. The problem is that residual cleaning solution results in poor adhesion of the prime or finish coatings to the assembly or causes prime or finish coating runs.

Furthermore, seat fabrication employing a seat pan requires the seat pan embodiment to resist inelastic deformation, be easily and quickly assembled, and to maintain proper assembly alignment.

FIELD OF THE INVENTION

The present application relates to a method for fabricating a foam seat for use in general applications such as with garden tractors or recreational vehicles.

DESCRIPTION OF RELATED ART

Devices of the type described above are known in the art, for example from U.S. Pat. No. 4,577,907. Conventional seat assemblies of this type have, however, the disadvantage that in order to ensure that the seat bottom is coated with a uniform and aesthetically appealing finish, the bottom mounted spring mounting plate must be coated prior to assembly or additional cleaning operations must be employed in order to avoid entrapment of solvents or contaminants in recesses and crevices and thereby prevent the proper adhesion of coating materials.

Another disadvantage of conventional designs is that the use of several plates and several fasteners add unnecessary weight to the finished seat. Also, the conventional designs require the separate insertion of multiple threaded fasteners into a multiplicity of mounting plates which require alignment. The greater number of manufacturing and assembly operations result in unnecessarily high production costs.

OBJECTS OF THE INVENTION

In view of the foregoing, it is the aim of the invention to achieve the following objects singly or in combination:

to provide for the uniform application and bonding of prime and finish protective coatings in a foam seat while providing an aesthetically appealing appearance of externally visible surfaces in the assembled product; and to provide a fast and economical method of fabrication and installation of a foam seat.

SUMMARY OF THE INVENTION

The above objects and other objects and advantages of the present invention pertain to the mounting of a reinforcing spring plate fastened to a seat pan. The plate being mounted on the top surface of the seat bottom conceals the area subject to poor finish application between the seat pan and the foam cushion material installed on it where it is not exposed to the elements and cannot contribute to a nonaesthetically pleasing appearance.

The spring plate, extending from a central seat mounting fastening means clearance hole, includes arcuate ridges which join with seat pan complementary narrow embossments; continuing outward, an offset extension of the spring plate is closely received by rectangular embossments of the seat pan. Cylindrical extensions of the spring plate offset extensions, passing through the clearance holes in the seat pan, are used in the manner of rivets to fasten the two components together as a single unit. The use of cylindrical extensions of the spring plate to fasten the spring plate to the seat pan reduces the assembly weight, material waste, number of components to be manually assembled and the number of operations necessary to assemble the seat.

Once the seat cushion and covering is installed, the finished seat is mounted by only one fastener passing through the seat pan, seat spring plate and engaging with an internally threaded fastening device bonded to the seat spring plate top surface. The seat is efficiently locked into place by entrapping the mounting spring between the arcuate embossments of the seat pan and the mounting fastener.

BRIEF DESCRIPTION OF THE DRAWINGS

In order that the invention may be clearly understood, it will now be described, by way of example, with reference to the accompanying drawings, wherein.

DESCRIPTION OF THE PREFERRED EMBODIMENT

Figure 1:
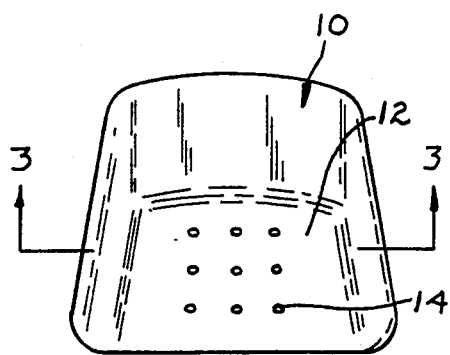
FIG. 1 is a perspective view as taken from the top front showing a conventional prior art seat pan.
Figure 2:
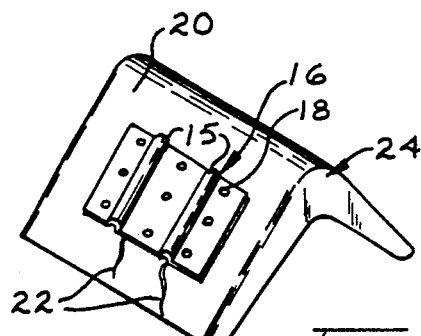
FIG. 2 is a perspective view as taken from the bottom left side of the prior art seat pan of FIG. 1.
Figure 3:
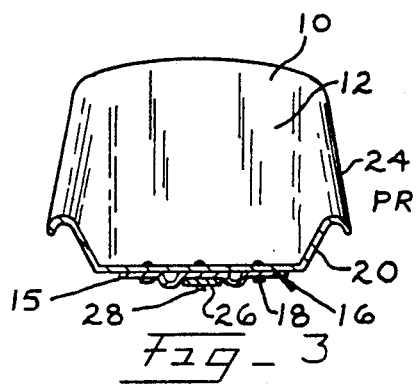
FIG. 3 is a cross-sectional elevation view as taken along Section 3—3 of FIG. 1.
Figure 4:
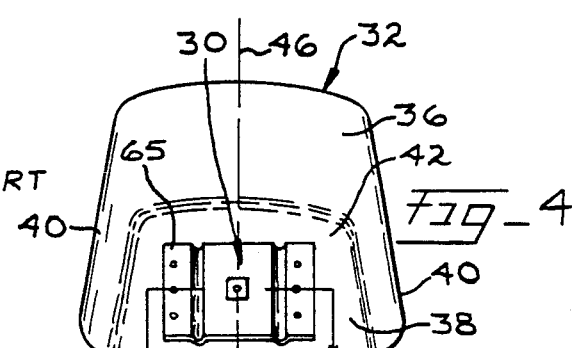
FIG. 4 is a top front perspective view of the instant invention.

FIG. 1 through FIG. 3 are provided in the manner of appreciating the prior art. With reference to FIG. 1, a typical seat pan 10 inner surface 12 is shown with plural penetrations 14 for receiving the spring mounting plate 16 fastening means 18 for an outside mounted spring plate of the conventional design. From FIG. 2, a seat pan assembly outer surface 20 perspective view, we can see how the seat spring mounting plate 16 is mounted in a conventional configuration. This view also illustrates a typical paint run 22 which can result from cleaning process residue on the seat outside where it detracts from the finished appearance of the seat and if the run should prevent proper paint adhesion, would provide a site for corrosion to take place.

With reference to FIG. 3, the conventional seat pan assembly 24 is shown in cross-section to illustrate the seat pan 10, seat spring mounting plate 16, seat spring 26 and seat spring fastening means 28 relationships as they exist in the typical configuration. The plate 16 includes parallel reinforcing ridges 15 and as the ridges 15 extend from the general plane of the plate and seat surface 20 cleaning solutions and paint may be trapped which will produce the runs 22.

The novel approach of the present invention is to place the spring mounting plate 30 on the inside surface of the seat pan 32 where it is coaxially mounted on a seat pan complementary surface. The seat pan is of formed material having a back 36, bottom 38 and two opposing lateral edges 40; the seat bottom having both an inside surface 42, an outer surface 44 and a central longitudinal axis 46 which is part of a vertical plane equidistant from the seat bottom lateral edges 40 and extending from the seat pan front edge 48 to seat pan back 36. In the seat pan is a central hole 50, which is clearance sized for receiving a seat mounting bolt fastener 52, and which is in alignment with the spring plate central hole 54. This construction places the area subject to cleaning residue on the inside of the seat pan where it is unseen and less exposed to the weather. Also, by placing the spring plate 30 on the inside, in service cyclic stresses are distributed over the larger area of the spring plate rather than being concentrated in the areas of fastening means penetration.

The seat pan has two elongated, arcuate cylindrical segment embossments 56 extending outward from the seat pan bottom outer surface 44, symmetrically located, parallel to, and spaced from the seat pan central longitudinal axis 46 shaped to compliment the spring plate arcuate cylindrical segment ridges 60. These embossments provide a seat spring engagement surface as well as strengthening the pan structure by acting as a reinforcing rib. Also, further removed from and parallel to the seat pan central longitudinal axis 46, rising from the seat pan bottom inside surface 42 are two symmetrically located rectangular embossments 64. The rectangular embossments define an offset region and are shaped to complement the spring mounting plate right and left offset regions 65. Through each embossment are spaced, plural clearance sized holes 66 receiving the outward extending spring plate cylindrical extensions 68 which constitute in this embodiment a fastening means. Besides providing a bedding surface for the spring plate 30, the embossments 64 add further strength to the pan structure.

The pan and plate are joined by means of the formed cylindrical extensions 68 projecting from the spring plate lower surfaces 70. The extensions 68 are formed by extruding the metal of regions 65 when the holes 69 are formed. The spring plate 30 is mounted on the inner surface 42 of the seat bottom. The fastening extensions 68 pass through seat pan clearance holes 66 and are staked over at 72 on the exterior surface of the seat bottom 44, thereby fastening the spring plate to the seat pan.

Figure 5:
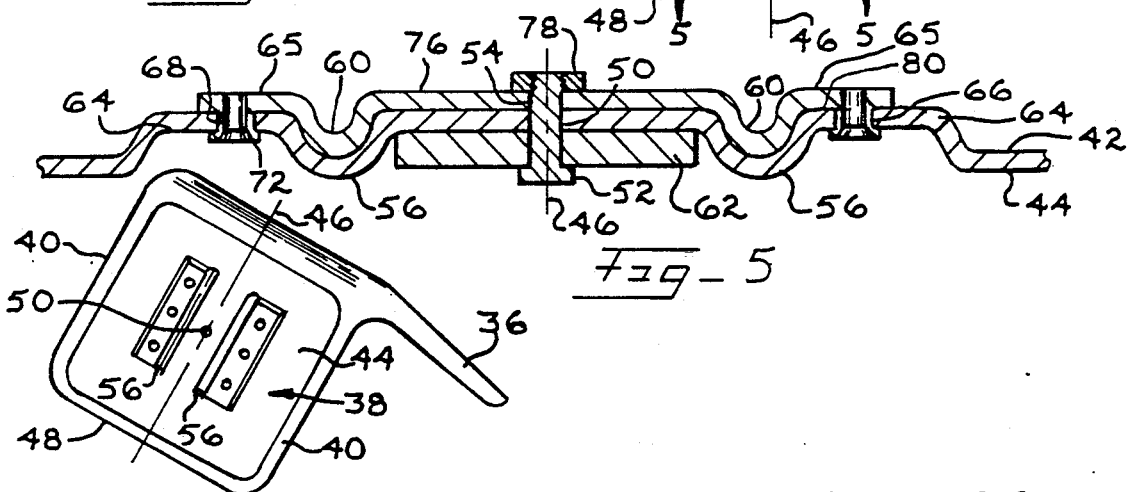
FIG. 5 is an enlarged detail cross-sectional elevation view as taken along Section 5—5 of FIG. 4, the mounting spring being shown.
Figure 6:
FIG. 6 is a perspective view of the instant invention as taken from the bottom left side of the seat pan.
Figure 7:
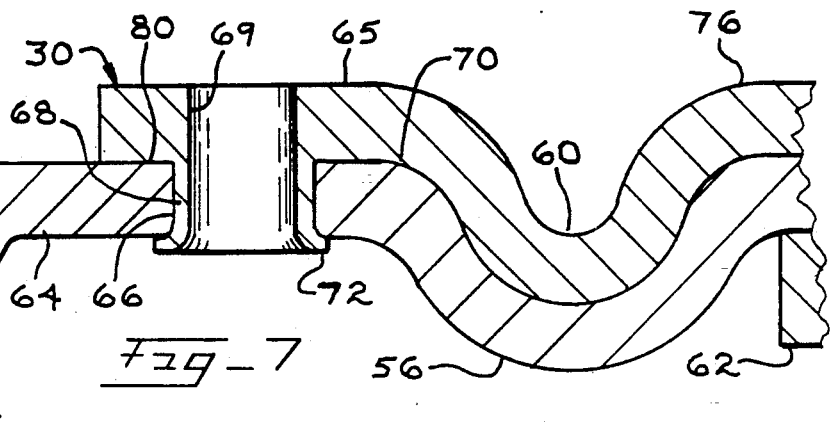
FIG. 7 is an enlarged detail partial cross-sectional elevation view of the seat pan and mounting plate features adjacent the mounting plate fasteners.

The spring mounting plate 30 is fabricated of sheet metal having upper surface 76 and lower surface 70 and a central plane. The central plane has a clearance sized central hole 54 through which passes a longitudinal axis 47, and which is in alignment with a internally threaded fastening nut 78. The internally threaded fastening nut is bonded to the spring mounting plate upper surface 76 for the purpose of receiving and engaging with the externally threaded seat mounting fastening bolt 52 thereby facilitating quick and easy securing of the seat assembly to the vehicle. As will be appreciated from FIG. 5, the leaf spring 62 supporting the seat is closely received between the pan embossments 56 and includes a hole for receiving bolt 52.

The plate 30 extends outward from pan longitudinal axis on a plane which is broken by symmetrically located, opposing elongated parallel arcuate ridges 60 which extend the width of the plate parallel with the pan longitudinal axis about which they are symmetrically located. Beyond the symmetrically located arcuate ridges 60, the plate extends on a plane parallel to the central plane, those extensions comprising bedding surfaces which are closely received by the seat pan right and left offset embossments 64.

Accordingly, it will be appreciated that the plate 30 closely conforms to the configuration of the seat pan and thus close conformation results in a strong assembly for attending the leaf spring 62 to the seat pan and as the plate 30 will be hidden from view by the seat cushion, not shown, a high quality attractive, corrosion resistant finish can be mounted on the exterior surface of the seat bottom.

It is appreciated that modifications to the inventive concepts may be apparent to those skilled in the art without departing from the scope of the invention.

I claim:

1. A seat pan for supporting a cushion comprising, in combination, a pan having a bottom and a back, said pan bottom having a general plane, a front edge, an inside surface and an exterior surface, a pair of spaced, elongated arcuate embossments defined in said pan bottom transversly disposed to said front edge, said embossments extending from said general plane from said exterior surface, a mounting spring plate engaging said pan bottom inside surface, said mounting spring plate including a pair of spaced arcuate ridges of a configuration complementary to the configuration of said arcuate embossments, said plate arcuate ridges being closely received within said pan arcuate embossments, spring mounting plate fastening means connecting said plate to said pan bottom, and aligned mounting spring fastening means defined in said pan bottom and mounting plate intermediate said pairs of arcuate embossments and arcuate ridges, said pan bottom exterior surface intermediate said arcuate embossments defining a mounting spring engaging surface.

2. In a seat pan as in claim 1, said pairs of arcuate ridges and arcuate embossments having a substantially cylindrical segment transverse cross section.

3. In a seat pan as in claim 1, said pairs of arcuate ridges and arcuate embossments being substantially parallel.

4. In a seat pan as in claim 1, said seat pan having a pair of offset regions, said offset regions being adjacent to, but laterally outwardly removed from said arcuate embossments, said offset regions complementarily configured to closely receive said spring mounting plate portions which extend outwardly from said arcuate ridges.

5. In a seat pan as in claim 4, said seat pan having holes in said offset regions and the spring mounting plate fastener means extending therethrough.

6. A seat pan for supporting a cushion comprising, in combination, a pan having a bottom and a back, said pan bottom having a general plane, a front edge, an inside surface and an exterior surface, a pair of spaced, elongated arcuate embossments defined in said pan bottom transversly disposed to said front edge, said embossments extending from said general plane from said exterior surface, offset regions defined in said seat pan transversly disposed to said front edge, said offset regions extending from said general plane and said inside surface, a spring mounting plate mounted on said pan bottom inside surface superimposed over and engaging said embossments and offset regions and having a configuration complementary thereto, aligned leaf spring mounting means defined in said pan bottom and said plate, and spring mounting plate fastening means defined on said plate engaging said seat bottom said fastening means connecting said spring mounting plate to said pan bottom inside surface.

7. In a seat pan as set forth in claim 6, said spring mounting plate fastening means comprising a plurality of outwardly extending cylindrical projections defined on said plate, passing through holes defined in said seat pan, said cylindrical projections being staked on said seat pan bottom exterior surface, a pair of arcuate ridges defined in said spring plate, said arcuate ridges being shaped complementary to and located in juxtaposition to said seat pan arcuate embossments, said leaf spring mounting means comprising a first hole defined in said spring mounting plate and a second hole defined in said pan bottom, and a bolt extending through said hole.

8. In a seat pan as in claim 6, said pairs of arcuate ridges and arcuate embossments being substantially parallel.

9. In a seat pan as in claim 6, said seat pan having a pair of offset regions, said offset regions each being adjacent to and laterally outwardly removed from said arcuate embossments, said offset regions being complementarily configured to closely receive spring mounting plate portions which extend laterally outwardly from said arcuate ridges.

* * * * *